United States Patent [19]

Ritter

[11] Patent Number: 4,878,574

[45] Date of Patent: Nov. 7, 1989

[54] APPARATUS FOR SORTING WORKPIECES

[75] Inventor: Siegfried Ritter, Reutlingen, Fed. Rep. of Germany

[73] Assignee: Gustav Wagner Maschinenfabrik GmbH & Co. KG, Reutlingen, Fed. Rep. of Germany

[21] Appl. No.: 156,209

[22] Filed: Feb. 16, 1988

Related U.S. Application Data

[63] Continuation-in-part of Ser. No. 895,793, Aug. 12, 1986, abandoned.

[30] Foreign Application Priority Data

Aug. 14, 1985 [DE] Fed. Rep. of Germany ....... 3529149

[51] Int. Cl.[4] .............................................. B65G 47/46

[52] U.S. Cl. .................................... 198/369; 209/698; 209/933

[58] Field of Search ..................... 198/369, 370, 502.3, 198/631; 193/40; 209/517, 521, 698, 933

[56] References Cited

U.S. PATENT DOCUMENTS

| | | | |
|---|---|---|---|
| 974,720 | 11/1910 | Stevenson | 209/933 |
| 997,468 | 7/1911 | Parker | 209/933 |
| 2,194,381 | 3/1940 | Cadman | 198/502.3 |
| 3,116,835 | 1/1964 | Brandon | 209/521 |
| 3,242,342 | 3/1966 | Gabar | 198/370 |
| 3,249,208 | 5/1966 | Carradus | 198/822 |
| 3,348,678 | 10/1967 | Flowers | 198/631 |
| 3,469,690 | 9/1969 | Erwin | 209/521 |
| 3,837,453 | 9/1974 | Klusmier | 193/40 |
| 4,016,979 | 4/1977 | Bibler | 198/370 |
| 4,024,948 | 5/1977 | Persson | 198/370 |
| 4,448,820 | 5/1984 | Buschor | 198/502.3 |

FOREIGN PATENT DOCUMENTS 3529149 2/1987 Fed. Rep. of Germany ...... 209/933

*Primary Examiner*—Joseph E. Valenza
*Attorney, Agent, or Firm*—Burgress, Ryan & Wayne

[57] ABSTRACT

An apparatus for sorting cut lengths discharged from an automatic metal cutting saw, includes at the discharge side of the saw, a movable endless link conveyor belt; a drive motor for driving the conveyor belt in a moving direction; a plurality of partitions arranged in spaced relation in the moving direction of the conveyor belt; a plurality of receiving bins arranged on opposite sides of the conveyor belt and mounted on the partitions, the receiving bins having different dimensions for receiving cut lengths of different dimensions, the receiving bins being spaced at predetermined lengths from the source; a mounting assembly for mounting the partitions for movement in the moving direction of the conveyor belt; a travelling distance sensor operatively connected with the drive motor; tipping cylinders located beneath the conveyor belt for tilting the conveyor belt downwardly on either side thereof; and a control assembly connected to the sensor and to the tipping cylinders for controlling the tipping cylinders to tilt the conveyor belt to deposit the cut lengths and selected ones of the receiving bins in response to information input to the control assembly such as the number, dimensions and intended use of the cut lengths and the postions and dimensions of the receiving bins, and the distance that the cut lengths have been conveyed along the conveyor belt as determined by the sensor.

10 Claims, 6 Drawing Sheets

APPARATUS FOR SORTING WORKPIECES

REFERENCE TO RELATED APPLICATION

The present invention is a continuation-in-part of US Patent application Serial No. 895,793, filed Aug. 12, 1986, now abandoned, entitled AN APPARATUS FOR SORTING WORKPIECES, to the same inventor herein.

BACKGROUND OF THE INVENTION

The invention is directed to an apparatus for sorting workpieces into cut lengths, which are discharged from an automatic processing machine such as a metal cutting saw.

For the purpose of discharging cut lengths from a metal cutting saw in the form of sorted lengths, it has been known to provide, at the discharge side of the processing machine, a track-guided carriage which is emptied of its contents at predetermined distances from the processing machine. It is a drawback of said apparatus that for each discharging operation, the carriage must perform a reciprocating movement and therefore performs an empty run.

OBJECTS AND SUMMARY OF THE INVENTION

The invention is based on the object of providing an apparatus for sorting workpieces in which the workpieces delivered by a processing machine are continuously that is, without interruption, discharged and sorted.

This object is solved by the features specified in claim 1. Further improvements of the invention are set out in the subclaims.

BRIEF DESCRIPTION OF THE DRAWINGS

An example of the invention will be described with reference to the drawing, in which.

DETAILED DESCRIPTION OF THE PREFERRED EMBODIMENTS

Figure 1:
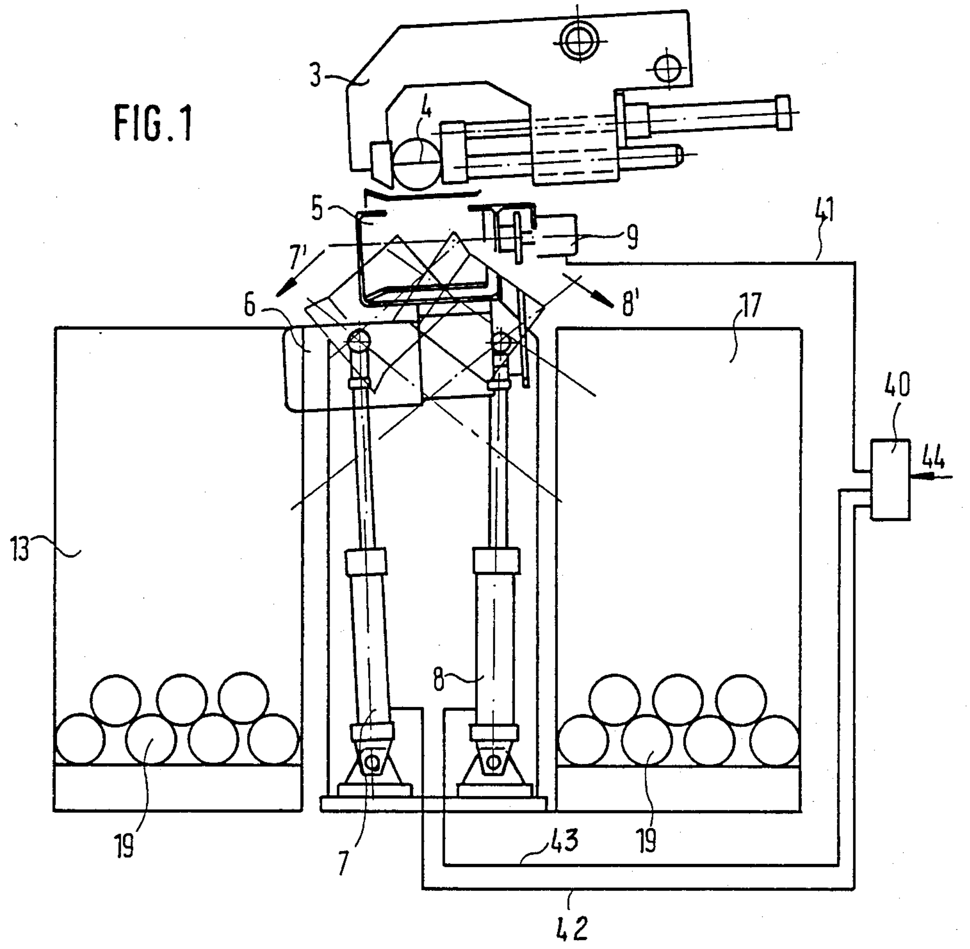
FIG. 1 is a front elevational view of the sorting apparatus according to the present invention.
Figure 2:
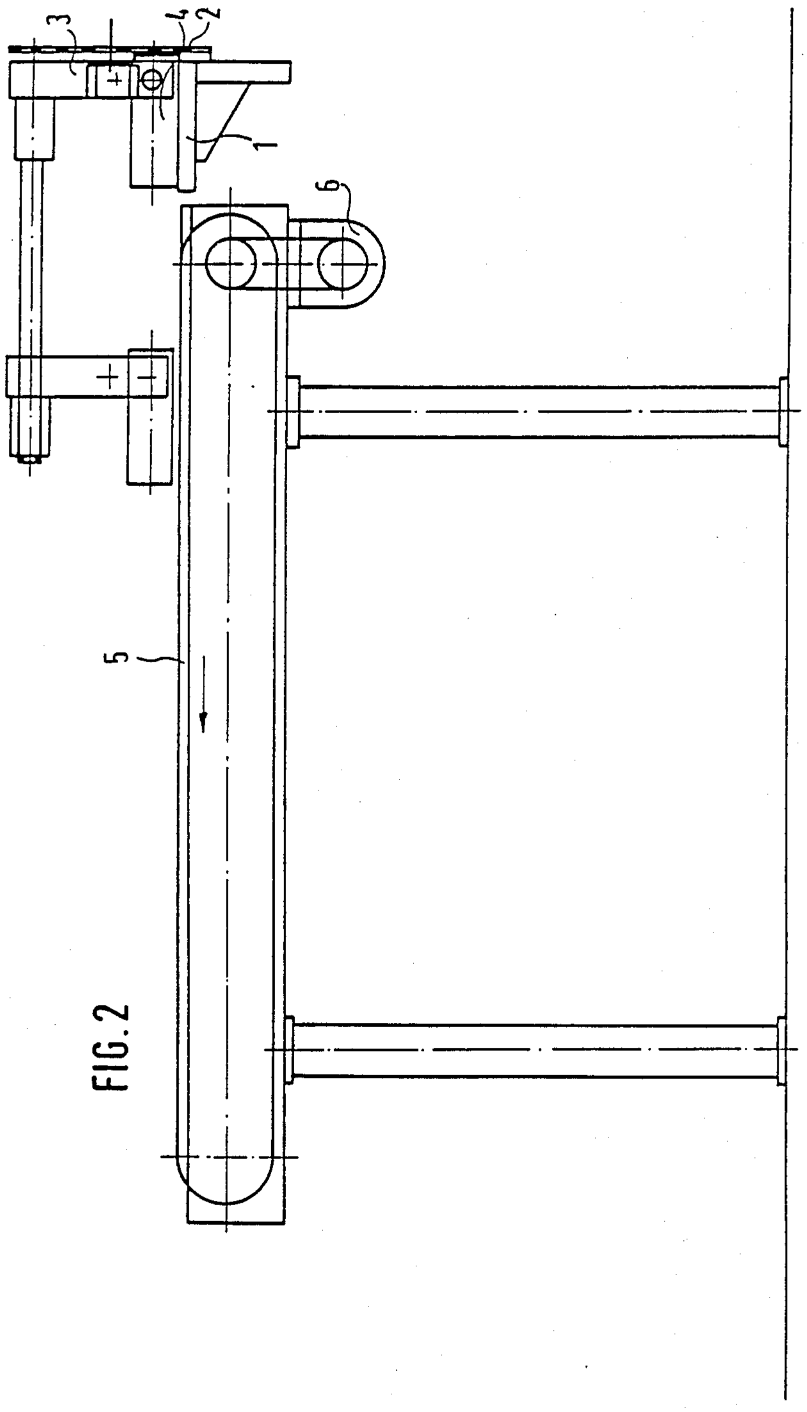
FIG. 2 is a side elevational view of the apparatus of FIG. 1.

As will be apparent from FIGS. 1 and 2, the discharge side of the cutting saw (not illustrated) is provided with a supporting table 1 which directly adjoins the saw blade 2. A gripping mechanism 3 is provided on the supporting table for placing a cut length 4 on a conveyor belt 5. Conveyor belt 5 includes a drive mechanism 6 and is a link conveyor with a central hinge. Both sides of conveyor belts are adapted to be tilted downward by means of tipping cylinders 7 and 8, whereby the cut lengths 4 are dropped off conveyor belt 5 sideways in the direction of arrows 7′ and 8′. The drive mechanism 6 for conveyor belt 5 is connected via a belt or chain to a sensor 9 for sensing operation of the conveying section.

Figure 3:
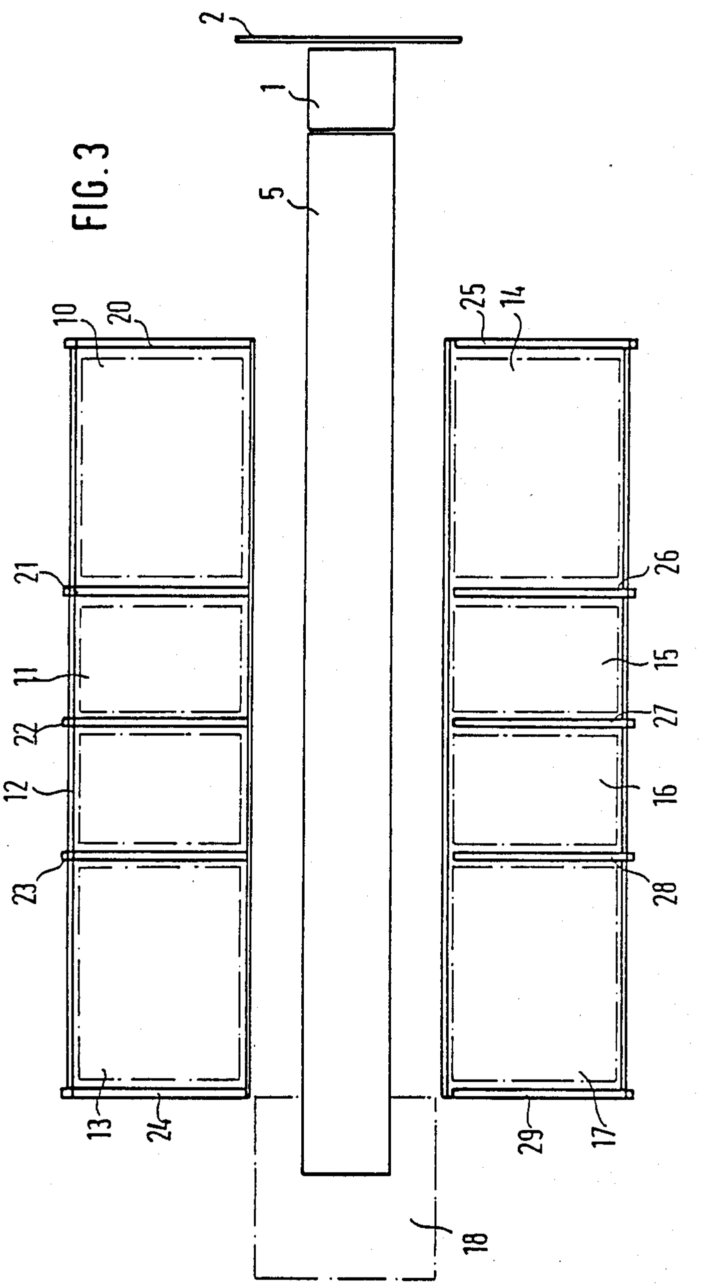
FIG. 3 is a top plan view of the apparatus of FIG. 1.
Figure 4:
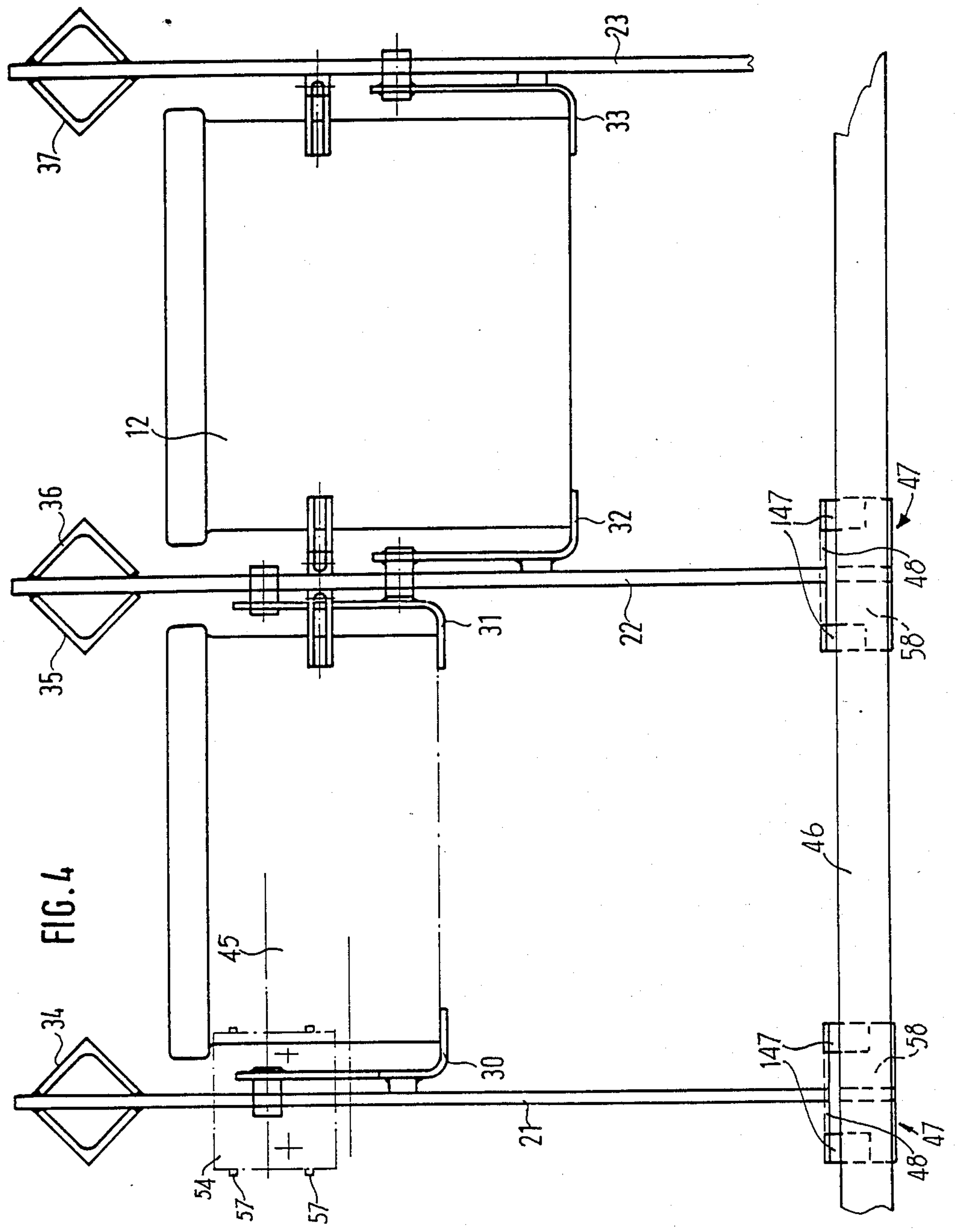
FIG. 4 is an enlarged side elevational view showing the compartments of the receiving bins of the apparatus of FIG. 1.

On either side of conveyor belt 5, receiving bins 10 to 17 are positioned which may have any desired dimensions and may especially be receiving bins provided by customers. A further receiving bin 18 (FIG. 3) is placed below the end of conveyor belt 5. The sorted cut lengths 19 rest inside the bins, as shown. The receiving bins 10 to 17 are arranged in compartments which are defined by partitions 20 to 29 movable in the belt advancing direction so as to match the compartments to the dimensions of the respective desired receiving bins. The partitions have brackets 30 to 33 (FIG. 4) attached thereto in which the receiving bins are hung on the partitions. The upper ends of the partitions are provided with guide plates 34 to 37 for reliably guiding the cut lengths dropped off the conveyor belt into the receiving bins. Furthermore, depositing rails 38 (FIG. 5) having plastics coatings 39 may be provided at the upper ends of the partitions so as to permit sorted depositing also of longer rods having a length in excess of the width of the available receiving bins.

To provide for longitudinal movement of partitions 20 to 29 in parallel to the advancing direction of conveyor belt 5, a respective upper guide rail 45 and a lower guide rail 46 are provided at both the sides of conveyor belts which are held at their end by respective upright supports 55. The mentioned guide rails 45, 46 are shown in cross section in FIGS. 5 and 6.

Upper guide rail 45 is encompassed from above by an inverted U-shaped hold and guide bracket 54 arranged in the upper region of each partition. Specifically, bracket 54 has a downwardly open channel **54*a* (FIG. 5) which receives upper guide rail 45 so that bracket 54 can ride along guide rail 45. Each guide bracket 54 extends on opposite sides of a respective partition, and is secured thereto by screws or bolts 57**.

Lower guide rail 46 provides lateral support of the partitions in the lower range thereof. For this purpose, respective support members 47 are arranged on opposite sides of the partitions in facing relation to lower guide rail 46. Each support member 47 is connected to the lower side of each partition, each support member 47 including a holding clip 58 extending parallel to the advance direction and welded at 58a to the lower face of a partition; two supporting blocks 147 welded to opposite ends of the holding clip 58 on opposite sides of the respective partition; and an L-shaped bracket 48 mounted to the upper surface of the supporting blocks 147 and encompassing the upper end of the lower guide rail 46.

Thus, lower guide rail 46 lies between supporting blocks 147 on the one hand and L-shaped brackets 48 allocated to them on the other hand. The L-shaped brackets 48 serve as a kind of safety bracket which prevents lateral traversing of the partitions about upper guide rail 45 away from lower guide rail 46. The partitions 20 to 29 are thus held or supported laterally on upper guide rail 45 and lower guide rail 46.

A special fixing of the partitions 20 to 29 guide rails 45 and 46 is not necessary in principle, above all not when the space of adjacent partitions to each other is designed by receiving bins 10 to 17 hung between these partitions. However, when receiving bins 10 to 17 are put down only onto brackets 30 to 33 between adjacent partitions according to FIGS. 3 and 4, it is recommended to fix partitions 20 to 29 to guide rails 45 and 46, for instance, by means of a set screw 56 allocated to the upper holding and guiding brackets 54 and/or to the lower supporting blocks 147, as shown in FIG. 5.

Figure 5:
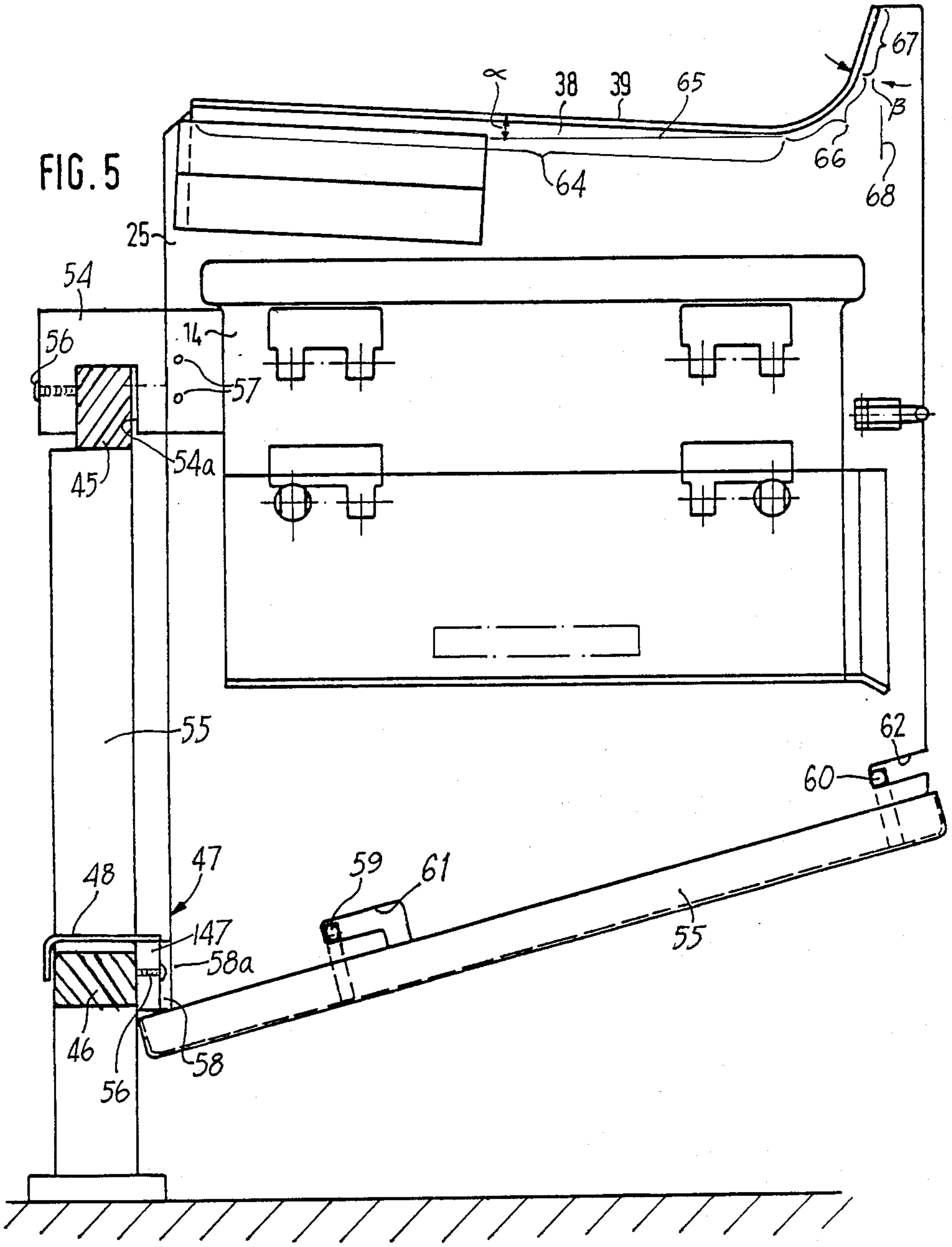
FIG. 5 is a front elevational view showing a compartment of a receiving bin of the apparatus of FIG. 1.

In the embodiment according to FIG. 5, a respective trough 55 for collecting material or dirt is hung at the lower sides of the partitions and is downwardly inclined with respect to the direction of conveyor belts. For this purpose, trough 55 has two brackets 59 and 60 spaced from each other which can be hung into slots 61 and 62, respectively, incorporated in the partitions in a corresponding space and extending in parallel to the lower side of the partitions.

Figure 6:
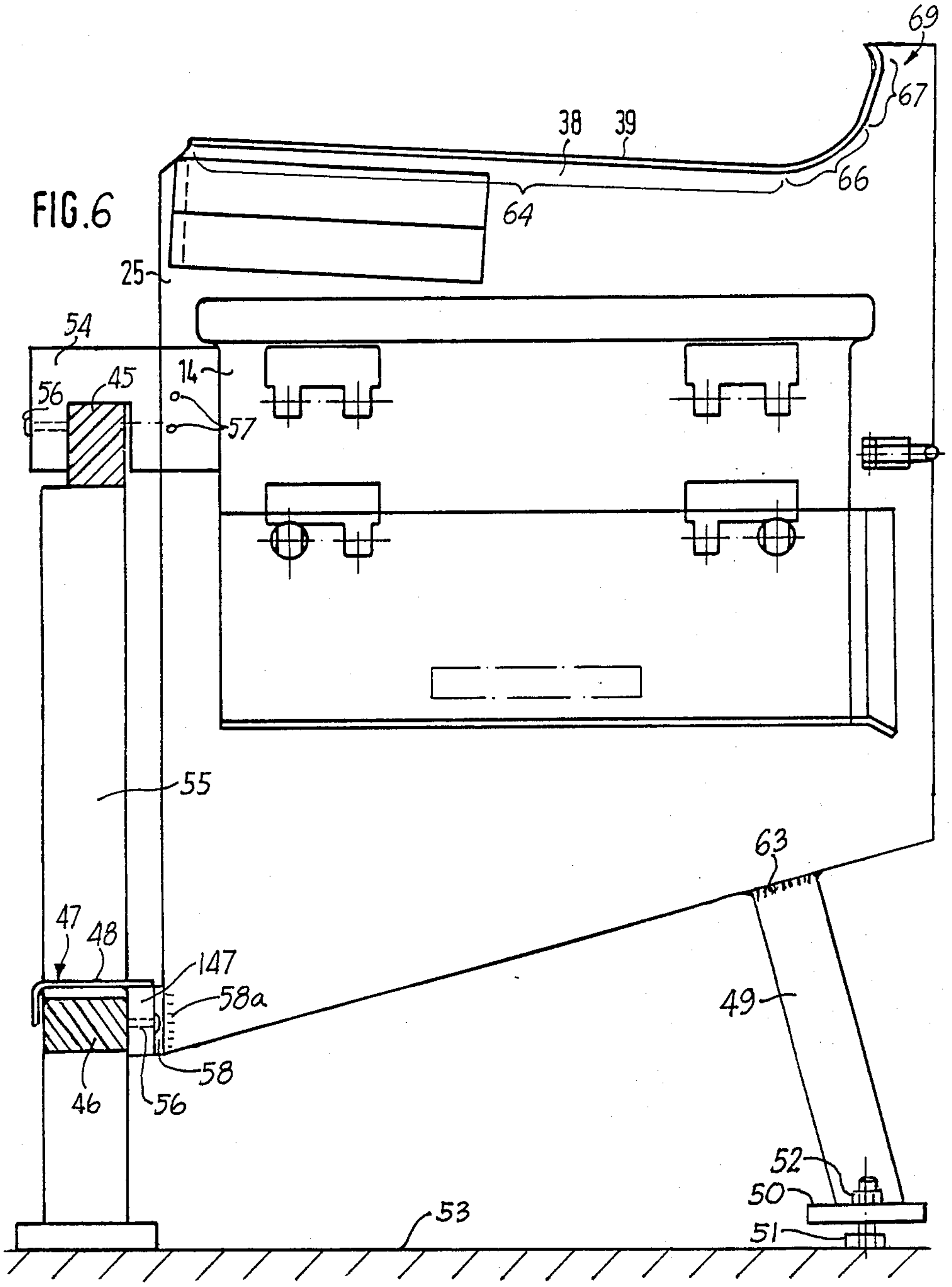
FIG. 6 is a front elevational view similar to FIG. 5, showing a modified compartment of a receiving bin.

The embodiment and the construction respectively of the partitions according to FIG. 6 differs from the above-mentioned embodiment in that no lower trough 55 for collecting dirt is provided. Further, an additional ground support 49 is provided and is welded at a weld seam 63, to the lower side of each partition which is away from conveyor belts. Ground support 49 provides relief for guide rails 45 and 46. According to the embodiment of FIG. 6, the free lower end support 49 adjacent the ground 53 has a flange 50 extending parallel to ground 53, flange 50 being penetrated by a supporting screw 51 which can be adjusted vertically and which can be locked by a nut 52. An optimal three-point support of partitions 20 to 29 is possible in this manner. This kind of the support is advantageous, especially when there are deposits of relatively large, and thus heavy, cut lengths. To move the partition, screw 51 is screwed upwardly out of contact with ground 53.

With respect to depositing rails 38 being provided with plastic coatings 39 at the upper sides of the partitions 20 to 29, it is noted that this coating 39 conists respectively of three sections, of which the section 64 next to conveyor belts extends in a direction perpendicular to and away from conveyor belts, slightly downwardly inclined at an angle of inclination $\alpha$ of about 4°-10°, preferably about 5°, in regard to a horizontal line 65. From this section 64, an arched section 66 and a section 67 are connected and extend in a upwardly inclined manner. The section 67 has an angle $\beta$ of about 10°-20° preferably about 15°, in regard to a vertical line 68.

The free upper end of section 67 can still be diminished or directed somewhat to the inside, that is, in the direction of the belts, in order to prevent a rolling-down of the cut lengths over the upper free edge of section 67 when the depositing rails 38 are overloaded with dropped cut lengths. This is shown in FIG. 6 in which an L-section 69 is directed to the inside and toward the belts.

It is guaranteed, by reason of the mentioned slight inclination of section 64, that round cut lengths dropped on the depositing rails roll in the direction toward section 66, that is, into a region of a facilitated admittance for transport.

A control unit 40 is connected via a line 41 to sensor 9 and via lines 42 and 43 to tipping cylinders 7 and 8. Information 44 concerning the number, the dimensions and the intended use of the workpieces 4 and 19, respectively, and the position and dimensions of the receiving bins 10 to 17 for a batch of workpieces to be processed are input into control unit 40, which processes such information to produce timed control instructions for a respective one of the tipping cylinders 7 and 8, while taking into account the distance that the workpieces are conveyed along the conveyor belt 5 and which is repectively determined by sensor 9.

The apparatus according to the invention operates as follows:

The sawing machine is provided with a control system for storing the batches to be cut in accordance with customer, deadline, number, size of workpieces, etc. Moreover, the dimensions of the receiving bins provided for the cut batches and their locations along the conveyor belt are stored. When a predetermined batch is cut, signals based on the information processed in the control system are applied to sensor 9 which in response thereto determines the distance that the conveyor belt will travel with the workpieces of the batch. When a cut length discharged from the processing machine has travelled such distance, it will be dropped off the conveyor belt either by tilting the conveyor belt towards a given side or otherwise, for instance by means of a pusher. For this operation, the distance which the cut length must travel on the conveyor belt is determined in consideration of the belt travelling speed such that, at the dropping location, the cut length will be positioned in a defined orientation relative to the receiving bin that is, with its center at the center of the receiving bin.

The cut lengths must securely rest on the conveyor belt such that they cannot be displaced longitudinally thereof, because otherwise the stored conveying distance to be travelled will not coincide with the actual conveying distance. The trough-like design of the conveyor belt helps to retain the cut length in the desired position on the conveyor belt.

The control system also monitors the dimensions of the cut lengths and of the receiving bins, and it is ensured that excessively long cut lengths will not be dropped into too narrow receiving bins.

The apparatus according to the invention permits continuous discharging and sorted dropping of the lengths cut by the sawing machine so that the cut lengths will not pile up. It may, however, also be desired to have a plurality of similar cut lengths accumulate at a predetermined location of the conveyor belt and to drop them jointly into a receiving bin 18 disposed at the end of the conveyor belt.

Due to the fact that the receiving bins are suspended from the partitions, there remains a free space beneath the receiving bins so that they may be carried off on a lifting truck upon completion of the sorting operation.

The control system for the sawing machines may be designed such that, under consideration of the number and dimensions of the cut lengths and the dimensions of the receiving bins, optimum allocation is effected, and in individual cases, also multiple loading of receiving bins may be provided. Furthermore, the control system can also optimize the conveying distances with due consideration of the dimensions and the weight of the cut lengths.

Having described specific preferred embodiments of the invention with reference to the drawings, it will be appreciated that the present invention is not limited to those specific embodiments, and the present invention may be varied by one of ordinary skill in the art without departing from the spirit or scope of the invention as defined in the appended claims.

What is claimed is:

1. An apparatus for sorting cut lengths discharged from an automatic metal cutting saw, comprising at the discharge side of said saw:

a movable, endless link conveyor belt; drive means for driving said conveyor belt in a moving direction;

a plurality of partitions arranged in spaced relation in the moving direction of said conveyor belt;

mounting means for mounting said partitions for movement in the moving direction of said conveyor belt;

a plurality of receiving bins arranged on opposite sides of said conveyor belt and mounted on said partitions, said receiving bins having different dimensions for receiving cut lengths of different dimensions, said receiving bins being spaced at predetermined lengths from said source;

discharge means for discharging said cut lengths from said conveyor belt into respective ones of said bins; and trough means secured to a lower portion of each partition for collecting material falling therein.

2. An apparatus for sorting cut lengths discharged from an automatic metal cutting saw, comprising at the discharge side of said saw:

a movable, endless link conveyor belt; drive means for driving said conveyor belt in a moving direction;

a plurality of partitions arranged in spaced relation in the moving direction of said conveyor belt;

mounting means for mounting said partitions for movement in the moving direction of said conveyor belt;

a plurality of receiving bins arranged on opposite sides of said conveyor belt and mounted on said partitions, said receiving bins having different dimensions for receiving cut lengths of different dimensions, said receiving bins being spaced at predetermined lengths from said source;

discharge means for discharging said cut lengths from said conveyor belt into respective ones of said bins; and ground support leg means secured to lower portion of each partition away from said conveyor belt and extendable into engagement with a level surface for providing additional support to the bins supported by the partitions.

3. An apparatus as claimed in claim 2, wherein the conveyor belt is a link conveyor adapted to be tilted downward on either side.

4. An apparatus as claimed in claim 2, wherein the link conveyor is provided with a central hinge.

5. An apparatus as claimed in claim 2, wherein the conveyor belt is trough-shaped.

6. An apparatus as claimed in claim 2, wherein each side of the conveyor belt (5) is operatively connected with a tipping cylinder (7, 8).

7. An apparatus as claimed in claim 2, wherein the receiving bins (10 to 17) are adapted to be hung into compartments constituted by movable partitions (20 to 29).

8. An apparatus as claimed in claim 2, wherein guide plates (34 to 37) are mounted on the upper ends of the partitions (20 to 29).

9. An apparatus as claimed in claim 2, wherein depositing rails (38) are mounted on the upper ends of the partitions (20 to 29).

10. An apparatus as claimed in claim 2, comprising a system (40) for controlling the devices (7, 8) for discarding the workpieces from the conveyor belt, said system being supplied with information concerning the workpieces (4,19) and the receiving bins (10 to 17).

* * * * *